(12) United States Patent
Tamura

(10) Patent No.: US 11,732,779 B2
(45) Date of Patent: Aug. 22, 2023

(54) POWER TRANSMISSION DEVICE AND METHOD FOR MANUFACTURING POWER TRANSMISSION DEVICE

(71) Applicant: SUMITOMO HEAVY INDUSTRIES, LTD., Tokyo (JP)

(72) Inventor: Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/895,726

(22) Filed: Aug. 25, 2022

(65) Prior Publication Data
US 2023/0074194 A1    Mar. 9, 2023

(30) Foreign Application Priority Data

Sep. 6, 2021    (JP) .................................. 2021-144515

(51) Int. Cl.
| | |
|---|---|
| *F16H 57/021* | (2012.01) |
| *F16H 1/32* | (2006.01) |
| *F16H 55/08* | (2006.01) |
| *F16H 57/032* | (2012.01) |
| *F16H 49/00* | (2006.01) |

(52) U.S. Cl.
CPC ........... *F16H 1/32* (2013.01); *F16H 55/0833* (2013.01); *F16H 49/001* (2013.01); *F16H 57/021* (2013.01); *F16H 57/032* (2013.01); *F16H 2001/323* (2013.01)

(58) Field of Classification Search
CPC .... F16H 1/32; F16H 2001/323; F16H 49/001; F16H 57/032; F16H 57/021; F16H 2001/325; F16H 57/023; F16H 2057/02017; H02K 5/02; H02K 5/16
See application file for complete search history.

(56) References Cited

U.S. PATENT DOCUMENTS

| | | | |
|---|---|---|---|
| 2,966,811 A * | 1/1961 | Sundt ..................... | H01Q 3/005 |
| | | | 343/882 |
| 11,274,736 B2 | 3/2022 | Tamura et al. | |
| 2016/0319906 A1* | 11/2016 | Kawamura .......... | B62D 5/0454 |

FOREIGN PATENT DOCUMENTS

| | | | | |
|---|---|---|---|---|
| DE | 102017128637 A1 * | 6/2018 | ............. | B25J 9/103 |
| JP | 2018-155313 A | 10/2018 | | |
| KR | 20110061915 A * | 6/2011 | | |
| WO | WO-2020235399 A1 * | 11/2020 | | |

* cited by examiner

*Primary Examiner* — Sherry L Estremsky
(74) *Attorney, Agent, or Firm* — Michael Best & Friedrich LLP

(57) ABSTRACT

There is provided a technique capable of increasing support rigidity of a bearing when a support member expands due to moisture absorption. A power transmission device includes: a rotary shaft; a support member disposed outside the rotary shaft in a radial direction; a bearing disposed between the rotary shaft and the support member; and a fitting member fitted to an outer peripheral portion of the support member. The fitting member is made of a material having lower hygroscopicity than hygroscopicity of a material of the support member.

13 Claims, 6 Drawing Sheets

POWER TRANSMISSION DEVICE AND METHOD FOR MANUFACTURING POWER TRANSMISSION DEVICE

RELATED APPLICATIONS

The content of Japanese Patent Application No. 2021-144515, on the basis of which priority benefits are claimed in an accompanying application data sheet, is in its entirety incorporated herein by reference.

BACKGROUND

Technical Field

Certain embodiments of the present disclosure relate to a power transmission device.

Description of Related Art

The related art discloses a power transmission device including a rotary shaft; a support member disposed outside the rotary shaft in a radial direction; and a bearing disposed between the support member and the rotary shaft.

SUMMARY

According to an embodiment of the present invention, there is provided a power transmission device of the present disclosure includes: a rotary shaft; a support member disposed outside the rotary shaft in a radial direction; a bearing disposed between the rotary shaft and the support member; and a fitting member fitted to an outer peripheral portion of the support member. The fitting member is made of a material having lower hygroscopicity than hygroscopicity of a material of the support member.

DETAILED DESCRIPTION

The inventors of this application have examined the power transmission device, and as a result, have come to recognize the following new problems. The support member of the power transmission device may expand due to moisture absorption depending on the material of the support member. Normally, when the support member expands due to moisture absorption, the support member tends to greatly bulge and deform in a radial outward direction. As a result, a gap between the support member and the bearing widens, thereby causing a decrease in the support rigidity of the bearing, which is a problem. A technique to address this issue has not been proposed yet, and a proposal of the technique has been desired.

It is desirable to to provide a technique capable of increasing support rigidity of a bearing when a support member expands due to moisture absorption.

Hereinafter, embodiments will be described. The same components are denoted by the same reference symbols, and a duplicated description will not be repeated. In each drawing, for convenience of description, components are omitted, enlarged, or reduced as appropriate. The drawings shall be viewed according to the directions of reference symbols.

One Embodiment

Figure 1:
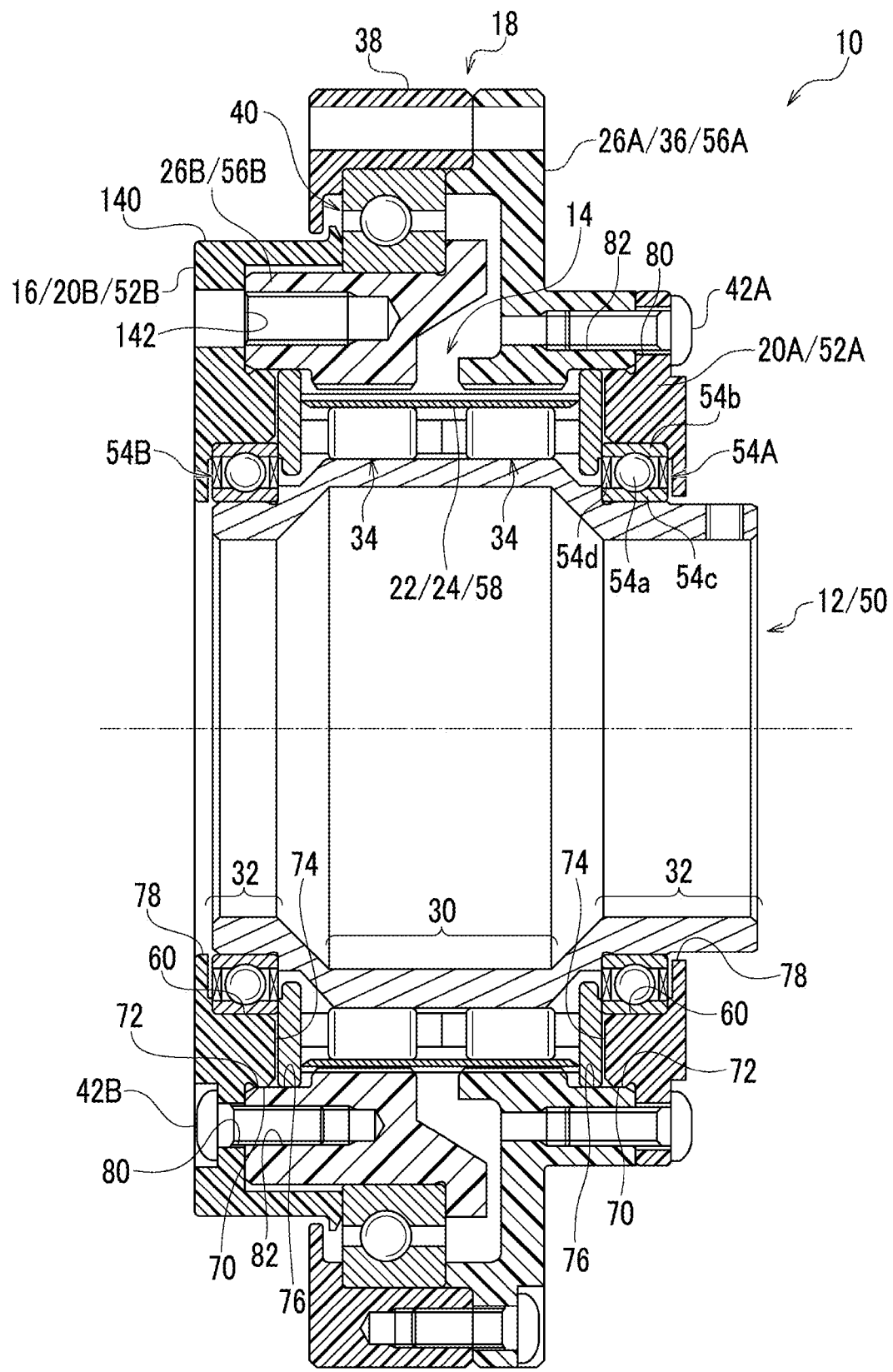
FIG. 1 is a side cross-sectional view of a power transmission device of one embodiment.

Referring to FIG. 1, a power transmission device 10 of the present embodiment is a gear device. The power transmission device 10 includes an input shaft 12; a gear mechanism 14 that transmits a rotation of the input shaft 12; an output member 16 that outputs output rotation extracted from the gear mechanism 14, to a driven machine; and a casing 18 that accommodates the gear mechanism 14. In addition, the power transmission device 10 of the present embodiment includes a first cover 20A disposed on one side in an axial direction (right side in the drawing) with respect to the gear mechanism 14, and a second cover 20B disposed on the other side in the axial direction (left side in the drawing) with respect to the gear mechanism 14. The output member 16 of the present embodiment is the second cover 20B. The input shaft 12 functions as a rotary shaft 50 to be described later. In this specification, an axial direction, a radial direction, and a circumferential direction of the rotary shaft 50 are simply referred as to an "axial direction", a "radial direction", and a "circumferential direction", respectively.

The gear mechanism 14 of the present embodiment is a bending meshing type gear mechanism. The gear mechanism 14 includes an external gear 24 and internal gears 26A and 26B which mesh with each other and of which one serves as a bending gear 22. The gear mechanism 14 can bend and deform the bending gear 22 to rotate one of the external gear 24 and the internal gears 26A and 26B, and to extract an axial rotation component thereof from the output member 16 as output rotation. In the present embodiment, the external gear 24 serves as the bending gear 22, and the external gear 24 can be rotated. The gear mechanism 14 of the present embodiment is a tubular bending meshing type gear mechanism using the first internal gear 26A and the second internal gear 26B.

The input shaft 12 is rotatable by rotational power transmitted from a drive source (not shown). The drive source is, for example, a motor, a gear motor, an engine, or the like.

The input shaft 12 of the present embodiment is a wave generator shaft. The input shaft 12 that is a wave generator shaft includes a wave generator 30 that bends and deforms the bending gear 22, and shaft portions 32 provided on both sides in the axial direction with respect to the wave generator 30. An outer peripheral shape of the wave generator 30 is an elliptical shape in a cross section perpendicular to the axial direction of the input shaft 12. The "ellipse" in the present specification is not limited to a geometrically exact ellipse, but also includes a substantially elliptical shape. An outer peripheral shape of the shaft portions 32 is a circular shape in a cross section perpendicular to the axial direction of the input shaft 12.

The bending gear 22 is rotatably supported by the wave generator 30 through wave generator bearings 34. The bending gear 22 is a tubular member having flexibility. The wave generator bearings 34 correspond to a plurality of the respective internal gears 26A and 26B, and are individually disposed inside the respective internal gears 26A and 26B.

The first internal gear 26A is disposed on the one side in the axial direction (right side in the drawing), and the second internal gear 26B is disposed on the other side in the axial direction (left side in the drawing). The first internal gear 26A has the number of internal teeth (for example, 102) different from the number of external teeth (for example, 100) of the external gear 24 serving as the bending gear 22, and the second internal gear 26B has the same number of internal teeth as the number of external teeth of the external gear 24.

The casing 18 includes a first casing member 36 also serving as the first internal gear 26A, and a second casing member 38 disposed outside the second internal gear 26B in the radial direction. The first casing member 36 and the second casing member 38 are connected and integrated with each other. A main bearing 40 is disposed between the second casing member 38 and the second internal gear 26B.

The first cover 20A covers an internal space of the casing 18 that accommodates the gear mechanism 14, from the one side in the axial direction. The second cover 20B covers the internal space of the casing 18 that accommodates the gear mechanism 14, from the other side in the axial direction. The first cover 20A is connected to the first internal gear 26A by a first screw member 42A and is integrated with the first internal gear 26A. The second cover 20B is connected to the second internal gear 26B by a second screw member 42B and is integrated with the second internal gear 26B.

An operation of the power transmission device 10 described above will be described. When the input shaft 12 is rotated by a drive source, the gear mechanism 14 operates. When the gear mechanism 14 operates, output rotation that is shifted (here, reduced) with respect to the rotation of the input shaft 12 is extracted from the gear mechanism 14 through the output member 16 and is output to the driven machine.

In the power transmission device 10 using the gear mechanism 14 that is a bending meshing type, when the wave generator shaft that is the input shaft 12 rotates, the bending gear 22 is bent and deformed into an elliptical shape according to the shape of the wave generator 30. When the bending gear 22 is bent and deformed in such a manner, a meshing position of the external gear 24 and the internal gear 26A changes in a rotation direction of the wave generator 30. At this time, meshing teeth of the external gear 24 and the first internal gear 26A that are different in the number of teeth are shifted in the circumferential direction every time the meshing position thereof makes one revolution. As a result, one of the external gear 24 and the first internal gear 26A (in the present embodiment, the external gear 24) rotates. In the present embodiment, since the external gear 24 and the second internal gear 26B have the same number of teeth, even when the meshing position thereof makes one revolution, the external gear 24 and the second internal gear 26B are synchronized without relative rotation. For this reason, an axial rotation component of the external gear 24 is extracted from the second cover 20B as the output member 16, through the second internal gear 26B synchronized with the external gear 24.

Here, the power transmission device 10 includes the rotary shaft 50; support members 52A and 52B disposed outside the rotary shaft 50 in the radial direction; rotary shaft bearings 54A and 54B disposed between the support members 52A and 52B and the rotary shaft 50; and fitting members 56A and 56B that are fitted to outer peripheral portions of the support members 52A and 52B, respectively.

The rotary shaft 50 is rotatable when the power transmission device 10 operates. The rotary shaft 50 of the present embodiment is the wave generator shaft (input shaft 12). The rotary shaft 50 of the present embodiment can rotate to move a driven gear 58 of the gear mechanism 14. The driven gear 58 in the present embodiment is the bending gear 22.

The support members 52A and 52B support the rotary shaft 50 through the rotary shaft bearings 54A and 54B, respectively. The support members 52A and 52B of the present embodiment include the first support member 52A formed of the first cover 20A, and the second support member 52B formed of the second cover 20B, respectively. The support members 52A and 52B each have a disk shape as a whole. The support members 52A and 52B include respective bearing disposition portions 60 on which the rotary shaft bearings 54A and 54B are disposed.

The rotary shaft bearings 54A and 54B allow the support members 52A and 52B and the rotary shaft 50 to rotate relative to each other. The rotary shaft bearings 54A and 54B of the present embodiment include the first rotary shaft bearing 54A disposed between the first support member 52A and the rotary shaft 50, and the second rotary shaft bearing 54B disposed between the second support member 52B and the rotary shaft 50, respectively.

The rotary shaft bearings 54A and 54B of the present embodiment each include a plurality of rolling elements 54a; an outer ring 54b and an inner ring 54c on each of which the plurality of rolling elements 54a roll; and a seal member 54d that seals an internal space of each of the rotary shaft bearings 54A and 54B. The outer ring 54b of the present embodiment is provided separately from the support members 52A and 52B, as a dedicated component for each of the rotary shaft bearings 54A and 54B. Alternatively, each of the support members 52A and 52B may also serve as the outer ring 54b. The inner ring 54c of the present embodiment is provided separately from the rotary shaft 50, as a dedicated component for each of the rotary shaft bearings 54A and 54B. Alternatively, the rotary shaft 50 may also serve as the inner ring 54c.

The fitting members 56A and 56B of the present embodiment include the first fitting member 56A formed of the first internal gear 26A, and the second fitting member 56B formed of the second internal gear 26B, respectively. The fitting members 56A and 56B of the present embodiment each have a disk shape as a whole.

The support members 52A and 52B include respective outer peripheral fitting portions 70 provided at outer peripheral portions of the support members 52A and 52B. The fitting members 56A and 56B include respective inner peripheral fitting portions 72 provided at inner peripheral portions of the fitting members 56A and 56B. The outer peripheral fitting portions 70 (outer peripheral portions) of the support members 52A and 52B are fitted to the respective inner peripheral fitting portions 72 (inner peripheral portions) of the fitting members 56A and 56B. Fit locations (the outer peripheral fitting portions 70 and the inner peripheral fitting portions 72) between the support members 52A and 52B and the fitting members 56A and 56B and the rotary shaft bearings 54A and 54B supported by the support members 52A and 52B overlap each other when viewed in the radial direction.

The support members 52A and 52B include respective annular protrusions 74 that protrude in the axial direction from axial side portions of the support members 52A and 52B to a side on which the fitting members 56A and 56B to which the support members 52A and 52B are fitted are disposed. The fitting members 56A and 56B include respective recessed portions 76 at axial side portions of the fitting members 56A and 56B, the recessed portions 76 being recessed in the axial direction opposite the support members 52A and 52B fitted to the fitting members 56A and 56B. The annular protrusions 74 of the support members 52A and 52B are spigot-fitted into the respective recessed portions 76 of the fitting members 56A and 56B. The outer peripheral fitting portions 70 of the support members 52A and 52B of the present embodiment are provided at respective outer peripheral portions of the annular protrusions 74, and the inner peripheral fitting portions 72 of the fitting members 56A and 56B are provided at respective inner peripheral portions of the recessed portions 76.

The support members 52A and 52B include respective through-holes 78 at central portions in the radial direction of the rotary shaft 50, the through-holes 78 penetrating through the respective support members 52A and 52B in the axial direction. Both the first support member 52A and the second support member 52B of the present embodiment also include the respective through-holes 78.

The support members 52A and 52B are fastened to the fitting members 56A and 56B by the screw members 42A and 42B, respectively. The first cover 20A serving as the first support member 52A is fastened to the first internal gear 26A serving as the first fitting member 56A, by the first screw member 42A. The second cover 20B serving as the second support member 52B is fastened to the second internal gear 26B serving as the second fitting member 56B, by the second screw member 42B. The screw members 42A and 42B are inserted into respective insertion holes 80 of the support members 52A and 52B, and are screwed to respective female screw holes 82 of the fitting members 56A and 56B.

In the present embodiment, both the support members 52A and 52B and the fitting members 56A and 56B are made of a resin-based material. The resin-based material mentioned here refers to a material of which the main material is resin. The resin used mentioned here is, for example, general-purpose engineering plastic, special engineer plastic, or the like. The resin-based material may consist of only resin as a main material, or may consist of a composite material of resin as a main material and another material. The composite material is, for example, a carbon fiber-reinforced resin, a glass fiber-reinforced resin, or the like.

The fitting members 56A and 56B are made of a material having lower hygroscopicity than that of the support members 52A and 52B fitted to the fitting members 56A and 56B. The first fitting member 56A is made of a material having lower hygroscopicity than that of the first support member 52A. Further, the second fitting member 56B is made of a material having lower hygroscopicity than that of the second support member 52B.

In order to quantitatively evaluate a high/low relationship of hygroscopicity between the support members 52A and 52B and the fitting members 56A and 56B, a moisture absorption rate obtained by a measurement test in accordance with the method A of JIS K7209 may be used. In the measurement test, first, a test piece cut out to a predetermined dimension is prepared. The test piece is cut into one of a square flat plate shape and a curved plate shape described in JIS K7209. Next, the test piece is dried in an oven adjusted to 50.0±2.0° C., for 24±1 hours. A mass m1 (mg) of the test piece immediately after the drying is measured. Thereafter, the test piece is placed in a desiccator, cooled to room temperature, and then immersed in distilled water of 23.0° C.±1.0° C. for 24±1 hours. A mass m2 (mg) of the test piece immediately after the immersion is measured. A moisture absorption rate c (%) can be obtained from the following equation (1) using the masses m1 and m2.

$$c=\{(m2-m1)/m1\}\times 100 \qquad (1)$$

The measurement test assumes that a member made of resin is a measurement target. However, a material having hygroscopicity other than resin may also be measured for a moisture absorption rate as a measurement target of the same measurement test. Further, when a material to be measured (for example, metal such as steel) does not have hygroscopicity, the moisture absorption rate may be regarded as zero.

The fitting members 56A and 56B of the present embodiment are made of, for example, a material having a moisture absorption rate of ½ or less of the moisture absorption rate of the material of the support members 52A and 52B. In satisfying this condition, the moisture absorption rate of the fitting members 56A and 56B may be zero. In satisfying this condition, the support members 52A and 52B are made of, for example, a resin such as polyamide (PA) or polyphthalamide (PPA). Further, the fitting members 56A and 56B are made of, for example, a resin such as polyetheretherketone (PEEK). The moisture absorption rate in the case of using PEEK is, for example, 0.1 or less, and the moisture absorption rate in the case of using PA is, for example, 1.3 to 2.5.

A high/low relationship of hygroscopicity between the first fitting member 56A and the second fitting member 56B does not particularly matter. The first fitting member 56A and the second fitting member 56B of the present embodiment have the same hygroscopicity (the same moisture absorption rate), but both may be different in hygroscopicity. Similarly, a high/low relationship of hygroscopicity between the first support member 52A and the second support member 52B does not particularly matter. The first support member 52A and the second support member 52B have the same hygroscopicity (the same moisture absorption rate), but both may be different in hygroscopicity.

The power transmission device 10 is a combination of resin members made of a resin-based material and metal members made of a metal-based material. The resin members of the present embodiment are the casing 18, the covers 20A and 20B, the internal gears 26A and 26B, and the like. The metal members of the present embodiment are the input shaft 12 (rotary shaft 50), the bending gear 22 (external gear 24), the wave generator bearings 34, the main bearing 40, the rotary shaft bearings 54A and 54B, and the like.

The metal-based material mentioned here refers to a material of which the main material is metal. The metal used mentioned here is, for example, an iron-based material such as cast iron or steel, or an aluminum-based material such as an aluminum alloy. The metal-based material may consist of only metal as a main material, or may consist of a composite material of metal as a main material and another material. The composite material mentioned here is, for example, an alloy, a fiber-reinforced metal, or the like. A metal-based material having a higher thermal conductivity than that of a resin-based material may be used.

In the present embodiment, the resin members other than the fitting members 56A and 56B may be made of only resin. Since the fitting members 56A and 56B mesh with the external gear 24 that is a metal member, the fitting members 56A and 56B are made of PEEK containing carbon fibers from the viewpoint of improving strength. The metal members of the present embodiment are made of only metal (specifically, steel). Accordingly, the metal members having higher thermal conductivities than those of the resin members are used together with the resin members, so that heat generated inside the power transmission device 10 can be easily transferred by the metal members. Consequently, the number of heat dissipation locations in the power transmission device 10 is increased, so that good heat dissipation can be obtained.

Effects of the power transmission device 10 described above will be described.

Figure 2A:
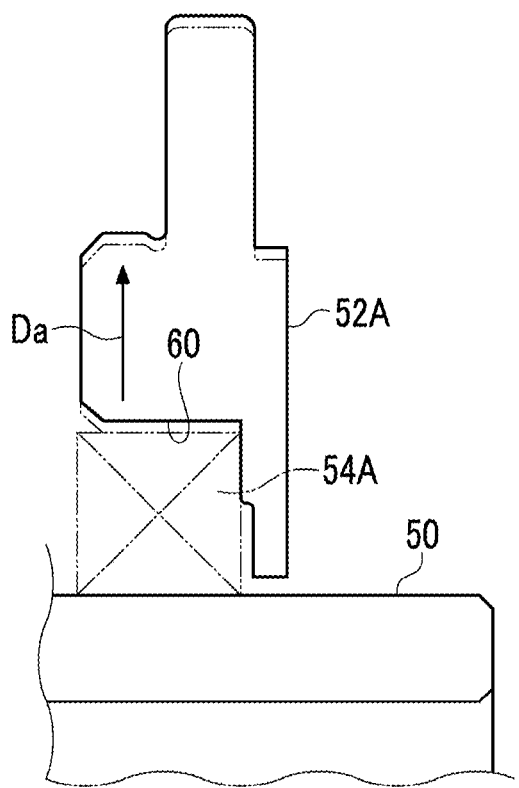
FIG. 2A is a view showing a state when a support member of a reference form has expanded.

Referring to FIG. 2A, hereinafter, regarding a description common to the first support member 52A, the first rotary shaft bearing 54A, and the first fitting member 56A and to the second support member 52B, the second rotary shaft bearing 54B, and the second fitting member 56B, a configuration of the former will be described with reference to the drawings. Hereinafter, in FIG. 2A and the like, for convenience of description, states before and after the support member 52A bulges and deforms are shown in an exaggerated manner.

A case is considered in which the support members 52A and 52B tend to expand due to moisture absorption in a state where the deformation of the support members 52A and 52B is not constrained by other members. In this case, generally, the entirety of the support members 52A and 52B tend to bulge and deform in a radial outward direction Da. In FIG. 2A, the state before bulging deformation is shown by an alternate long and two short dashed line, and the state after bulging deformation is shown by a solid line. Due to the bulging deformation, the bearing disposition portions 60 of the support members 52A and 52B are displaced in the radial outward direction. Accordingly, a gap between the support members 52A and 52B and the rotary shaft bearings 54A and 54B widens, thereby causing a decrease in the support rigidity of the rotary shaft bearings 54A and 54B. Particularly, the higher the absolute humidity of the usage environment becomes, the larger the bulging deformation amount of the support members 52A and 52B in the radial outward direction becomes. As a result, the higher the humidity of the usage environment becomes, the wider the gap between the rotary shaft bearings 54A and 54B and the support members 52A and 52B becomes, so that the support rigidity of the rotary shaft bearings 54A and 54B is likely to decrease.

Figure 2B:
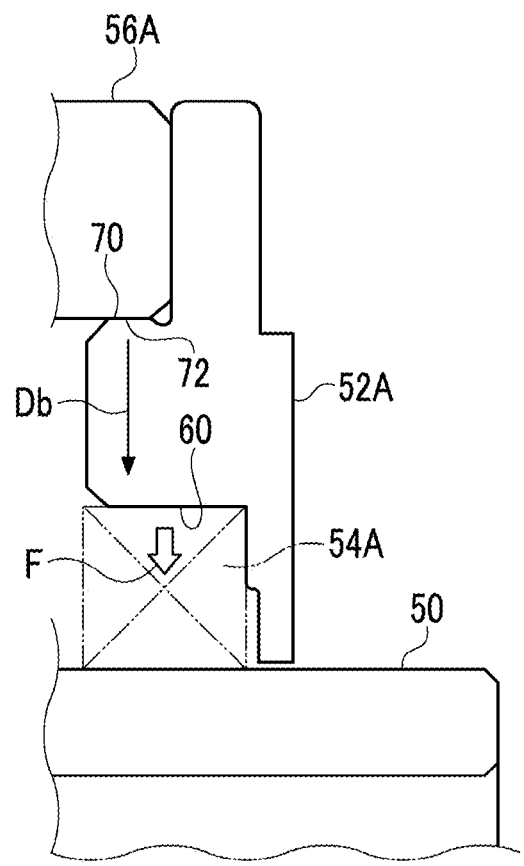
FIG. 2B is a view showing a state when a support member of one embodiment has expanded.

Referring to FIG. 2B, since the power transmission device 10 of the present embodiment includes the fitting members 56A and 56B that are fitted to the outer peripheral portions of the support members 52A and 52B, respectively, and the fitting members 56A and 56B are made of a material having lower hygroscopicity than that of the support members 52A and 52B, the follow advantages are obtained.

(A) A case is considered in which the support members 52A and 52B and the fitting members 56A and 56B tend to expand in a fitted state due to moisture absorption, so that the outer peripheral fitting portions 70 of the support members 52A and 52B and the inner peripheral fitting portions 72 of the fitting members 56A and 56B tend to bulge and deform in the radial outward direction. In this case, since the fitting members 56A and 56B have lower hygroscopicity than that of the support members 52A and 52B, an expansion amount of the fitting members 56A and 56B caused by moisture absorption is smaller than an expansion amount of the support members 52A and 52B caused by moisture absorption. For this reason, a displacement amount of the inner peripheral fitting portions 72 of the fitting members 56A and 56B in the radial outward direction is smaller than a displacement amount of the outer peripheral fitting portions 70 of the support members 52A and 52B in the radial outward direction. As a result, the bulging deformation of the support members 52A and 52B that tends to cause the displacement amount of the outer peripheral fitting portions 70 to be larger than the displacement amount of the inner peripheral fitting portions 72 is constrained by the inner peripheral fitting portions 72.

The bulging deformation of the support members 52A and 52B in the radial outward direction is constrained in such a manner, so that the support members 52A and 52B can bulge and deform to escape in a radial inward direction db. For this reason, the bearing disposition portions 60 of the support members 52A and 52B can be displaced in the radial inward direction. As a result, a gap around the rotary shaft bearings 54A and 54B between the support members 52A and 52B and the rotary shaft 50 can be closed. The "gap around the rotary shaft bearings 54A and 54B" mentioned here refers to the gap between the rotary shaft bearings 54A and 54B and the support members 52A and 52B, and to a gap between the rotary shaft bearings 54A and 54B and the rotary shaft 50.

The gap around the rotary shaft bearings 54A and 54B is closed in such a manner, so that the interference of the rotary shaft bearings 54A and 54B with the support members 52A and 52B and with the rotary shaft 50 can be increased. As a result, when the support members 52A and 52B expand due to moisture absorption, the support rigidity of the rotary shaft bearings 54A and 54B can be increased. Consequently, the shaft runout of the rotary shaft 50 supported by the rotary shaft bearings 54A and 54B can be reduced.

Further, according to the present embodiment, the higher the absolute humidity of the usage environment becomes, the larger the bulging deformation amount of the support member 52A in the radial inward direction is likely to become. Therefore, even when the absolute humidity of the usage environment has increased, the state where the gap around the rotary shaft bearings 54A and 54B is closed is maintained, so that the state where the support rigidity of the rotary shaft bearings 54A and 54B is increased can be maintained, which is an advantage.

Further, as in the present embodiment, when the driven gear 58 is moved by the rotary shaft 50, the shaft runout of the rotary shaft 50 is reduced, so that a state of meshing between the driven gear 58 and other gears (here, the external gear 24 and the internal gears 26A and 26B) can be stabilized. Accordingly, contact pressure on teeth surfaces of the driven gear 58 and of the other gears can be made uniform, and the life span thereof can be extended.

Further, when each of the support members 52A and 52B and the fitting members 56A and 56B is made of a resin-based material, normally, the higher the hygroscopicity becomes, the lower the component cost tends to become. Therefore, as compared to when the support members 52A and 52B are made of a resin-based material having the same hygroscopicity as that of the fitting members 56A and 56B, the component cost is likely to be reduced by the amount that a material having high hygroscopicity is used for the support members 52A and 52B, which is also an advantage.

(B) The support members 52A and 52B are made of a resin-based material, and the fitting members 56A and 56B are gears made of a resin-based material having lower hygroscopicity than that of the resin-based material forming the support members 52A and 52B. Therefore, when the power transmission device 10 is a gear device, weight saving of the gear device can be achieved as compared to when the fitting members 56A and 56B and the support members 52A and 52B are made of a metal-based material.

(C) The support members 52A and 52B include the respective through-holes 78 at the central portions in the radial direction, the through-holes 78 penetrating through the respective support members 52A and 52B in the axial direction. Therefore, when the support members 52A and 52B tend to bulge and deform in the radial inward direction due to expansion caused by moisture absorption, the bulging deformation is unlikely to be constrained by themselves. As a result, the support members 52A and 52B are likely to bulge and deform in the radial inward direction, so that the gap around the rotary shaft bearings 54A and 54B can be easily closed.

(D) The fit locations (the outer peripheral fitting portions 70 and the inner peripheral fitting portions 72) between the support members 52A and 52B and the fitting members 56A and 56B and the rotary shaft bearings 54A and 54B overlap each other when viewed in the radial direction. Therefore, in a state where the bulging deformation in the radial outward direction at the fit locations between the fitting members 56A and 56B and the support members 52A and 52B is kept constrained, the bearing disposition portions 60 of the support members 52A and 52B are likely to be displaced straight inward along the radial direction. Consequently, a radial load that is not assumed by design is unlikely to be applied to the rotary shaft bearings 54A and 54B from the bearing disposition portions 60 of the support members 52A and 52B, and the rotary shaft 50 is easily and stably supported by the rotary shaft bearings 54A and 54B.

Next, other inventive points of the power transmission device 10 will be described. In the power transmission device 10 of the present embodiment, under an environment where the absolute humidity is 0.003 (kg/kg) or higher, the support members 52A and 52B expand due to moisture absorption in a state where the support members 52A and 52B and the fitting members 56A and 56B are fitted to each other, so that a tightening load F (refer to FIG. 2B) acts on the rotary shaft bearings 54A and 54B from the support members 52A and 52B. The tightening load F acts inward from the support members 52A and 52B in the radial direction. It is meant that the tightening load F acts due to expansion caused by the moisture absorption of the support members 52A and 52B under the environment where the absolute humidity is at least 0.003. This condition is satisfied at least when the support members 52A and 52B and the fitting members 56A and 56B are in an equilibrium state where the moisture absorption amount does not change under the environment where the absolute humidity is 0.003 or higher and the atmospheric pressure is the standard atmospheric pressure (=1.0 atm).

The support members 52A and 52B expand due to moisture absorption as compared to the external dimensions immediately after the support members 52A and 52B and the fitting members 56A and 56B are fitted to each other in an assembly process (to be described later) of assembling the power transmission device 10, so that the tightening load F acts. In a case where the support members 52A and 52B and the fitting members 56A and 56B are fitted to each other by tightening, even when there is no expansion of the support members 52A and 52B caused by moisture absorption, the tightening load can act on the rotary shaft bearings 54A and 54B from the support members 52A and 52B. In this case, under the above-described environment, the support members 52A and 52B may further bulge and deform in the radial inward direction as compared to immediately after the support members 52A and 52B and the fitting members 56A and 56B are fitted to each other, so that the tightening load F increases.

Figure 3:
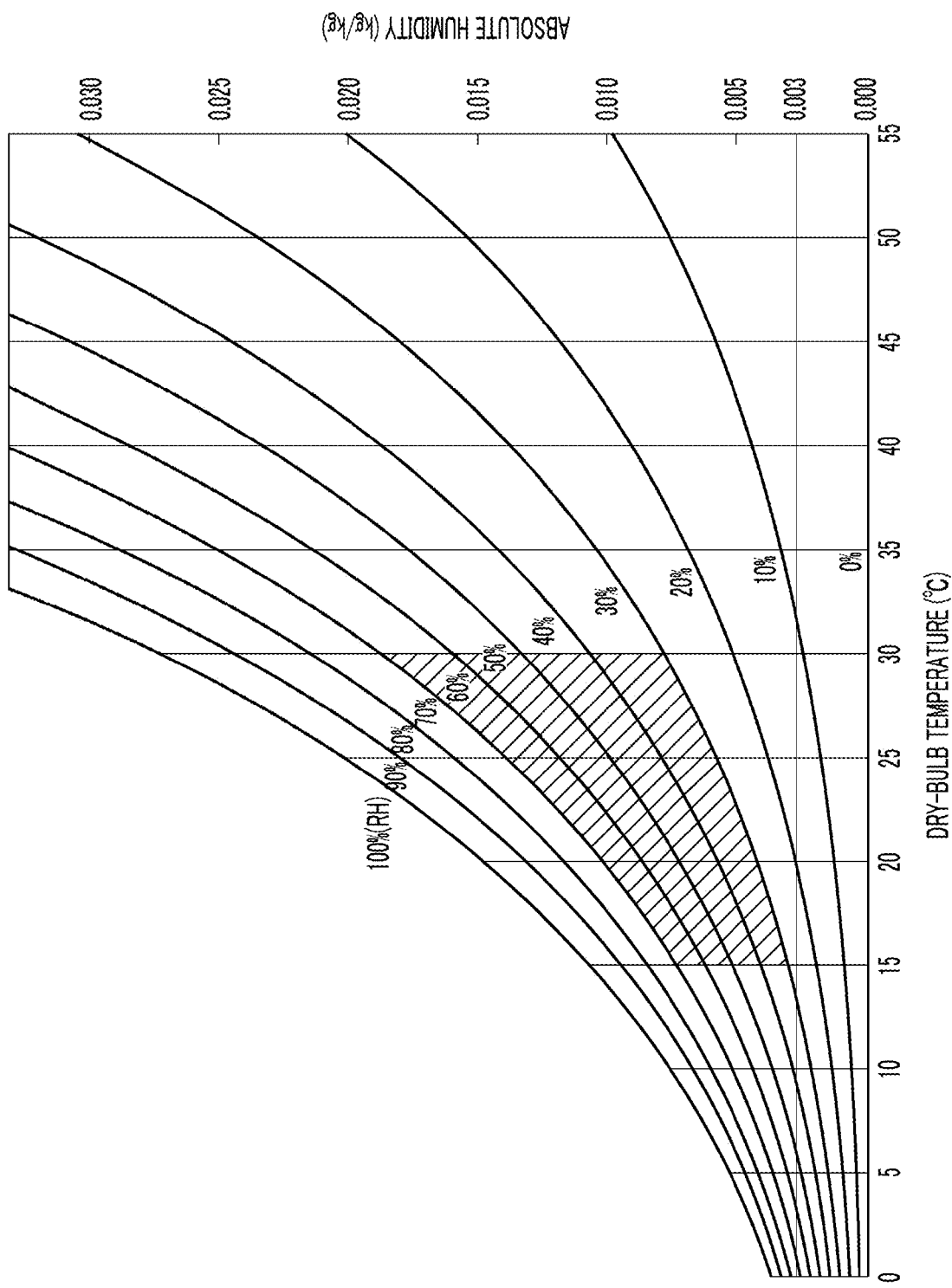
FIG. 3 is a psychrometric chart showing temperature and humidity in a usage environment of the power transmission device.

Referring to FIG. 3, FIG. 3 shows a psychrometric chart under a standard atmospheric pressure environment. In the usage environment of the power transmission device 10, normally, the temperature is in a range of 15° C. to 30° C. and the relative humidity (RH) is in a range of 30% to 70%. A hatched range in FIG. 3 indicates the usage environment, and the absolute humidity is in a range of 0.003 or higher. Therefore, if the tightening load F acts under the environment where the absolute humidity is at least 0.003, it is possible to cause the tightening load F to act regardless of a temperature and a relative humidity in a normal usage environment.

A case is considered in which the temperatures of a usage environment and an assembly environment of the power transmission device 10 are the same specific temperature. In this case, the support members 52A and 52B may expand at the specific temperature due to moisture absorption under an environment where the relative humidity is 30% or higher, so that the tightening load F acts on the rotary shaft bearings 54A and 54B. It is meant that the support members 52A and 52B may expand at the specific temperature due to moisture absorption under the environment where the relative humidity is at least 30%, so that the tightening load F acts on the rotary shaft bearings 54A and 54B. When the temperature is the same in the usage environment and in the assembly environment, for example, it is assumed that both the usage environment and the assembly environment are environments where the temperature is controlled to the specific temperature. Accordingly, it is possible to cause the tightening load F to act at the specific temperature regardless of a relative humidity (30% to 70%) in the normal usage environment.

Next, a method for manufacturing the power transmission device 10 described above will be described.

First, a drying process of drying at least the support members 52A and 52B is performed. In the drying process, it does not matter whether or not other components (for example, the fitting members 56A and 56B) of the power transmission device 10 need to be dried.

The specific example of a method for drying an object to be dried in the drying process is not particularly limited. The object to be dried may be dried, for example, by being left under in an environment where the object to be dried can be dried. The drying method is assumed to be, for example, vacuum drying, constant humidity drying, or the like. In the case of vacuum drying, the object to be dried is dried by being left in a vacuum environment depressurized by vacuum drying. In the case of constant humidity drying, the object to be dried is dried by being left in a constant humidity environment controlled to a predetermined humidity. In addition to these methods, the object to be dried may be dried by supplying a drying acceleration medium for promoting drying to the object to be dried. This method is assumed to be, for example, hot air drying, far-infrared drying, ultrasonic drying, or the like. The drying acceleration medium is, for example, hot air in the hot air drying, a far-infrared ray in the far-infrared drying, and an ultrasonic wave in the ultrasonic drying.

A predetermined humidity assumed under the usage environment of the power transmission device 10 is referred to as a reference humidity. The reference humidity is, for example, a lower limit humidity of an absolute humidity range assumed under the usage environment, but may be a humidity higher than the lower limit humidity. Further, a moisture absorption amount of the support members 52A and 52B when in an equilibrium state under an environment of the reference humidity is referred to as a reference moisture absorption amount. In this case, in the drying process, the support members 52A and 52B are dried to have a moisture absorption amount less than the reference moisture absorption amount. Accordingly, the support members 52A and 52B and the fitting members 56A and 56B are fitted to each other in the subsequent assembly process, and then are simply left under a usage environment where the humidity is the reference humidity or higher, so that the support members 52A and 52B can absorb moisture until the moisture absorption amount reaches the reference moisture absorption amount. Consequently, the support members 52A and 52B can stably expand due to moisture absorption as compared to the external dimensions immediately after the support members 52A and 52B and the fitting members 56A and 56B are fitted to each other. As described above, when the power transmission device 10 is used under the usage environment where the absolute humidity is 0.003 or higher, in the drying process, the support members 52A and 52B may be dried such that the moisture absorption amount is lower than the moisture absorption amount (reference moisture absorption amount) of the support members 52A and 52B when in an equilibrium state under an environment where the absolute humidity is 0.003 (reference humidity).

Figure 4:
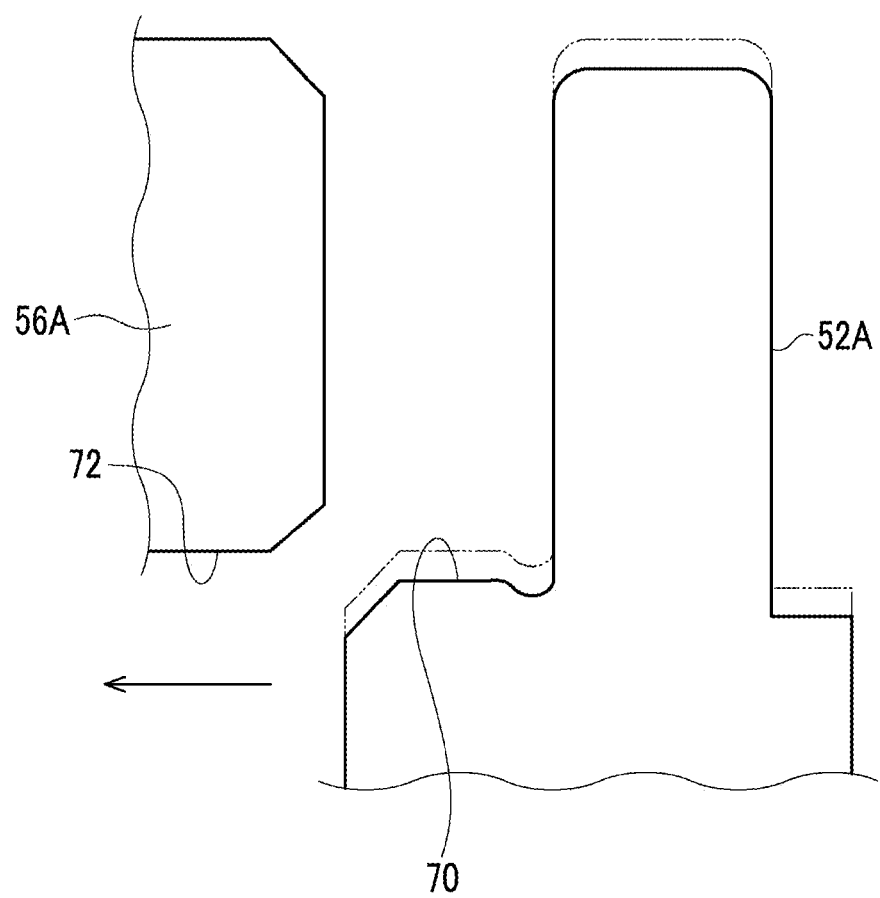
FIG. 4 is a view showing a state in the middle of a fitting process for the support member and a fitting member.

Next, the assembly process of assembling the power transmission device 10 using the components of the power transmission device 10 is performed. Referring to FIG. 4, the assembly process includes a fitting process of fitting the support members 52A and 52B that are dried in the drying process and the fitting members 56A and 56B to each other. In the fitting process, the outer peripheral fitting portions 70 of the support members 52A and 52B and the inner peripheral fitting portions 72 of the fitting members 56A and 56B are fitted to each other.

In the fitting process, the support members 52A and 52B that maintain the moisture absorption amount lower than the reference moisture absorption amount are fitted to the fitting members 56A and 56B. In FIG. 4, a state after the drying in the drying process is shown by a solid line, and a state before the drying in the drying process is shown by an alternate long and two short dashed line. Since the support members 52A and 52B are dried in the drying process, as compared to when the support members 52A and 52B are not dried, the bulging deformation amount in the radial outward direction when the support members 52A and 52B expand due to moisture absorption can be reduced, and the outer peripheral fitting portions 70 of the support members 52A and 52B can be displaced in the radial inward direction. Consequently, as compared to when the support members 52A and 52B are not dried, when the support members 52A and 52B and the fitting members 56A and 56B are fitted to each other, work can be performed in a state where the interference between both is reduced or in a state where the gap between both is left, and good workability can be obtained.

Figure 5:
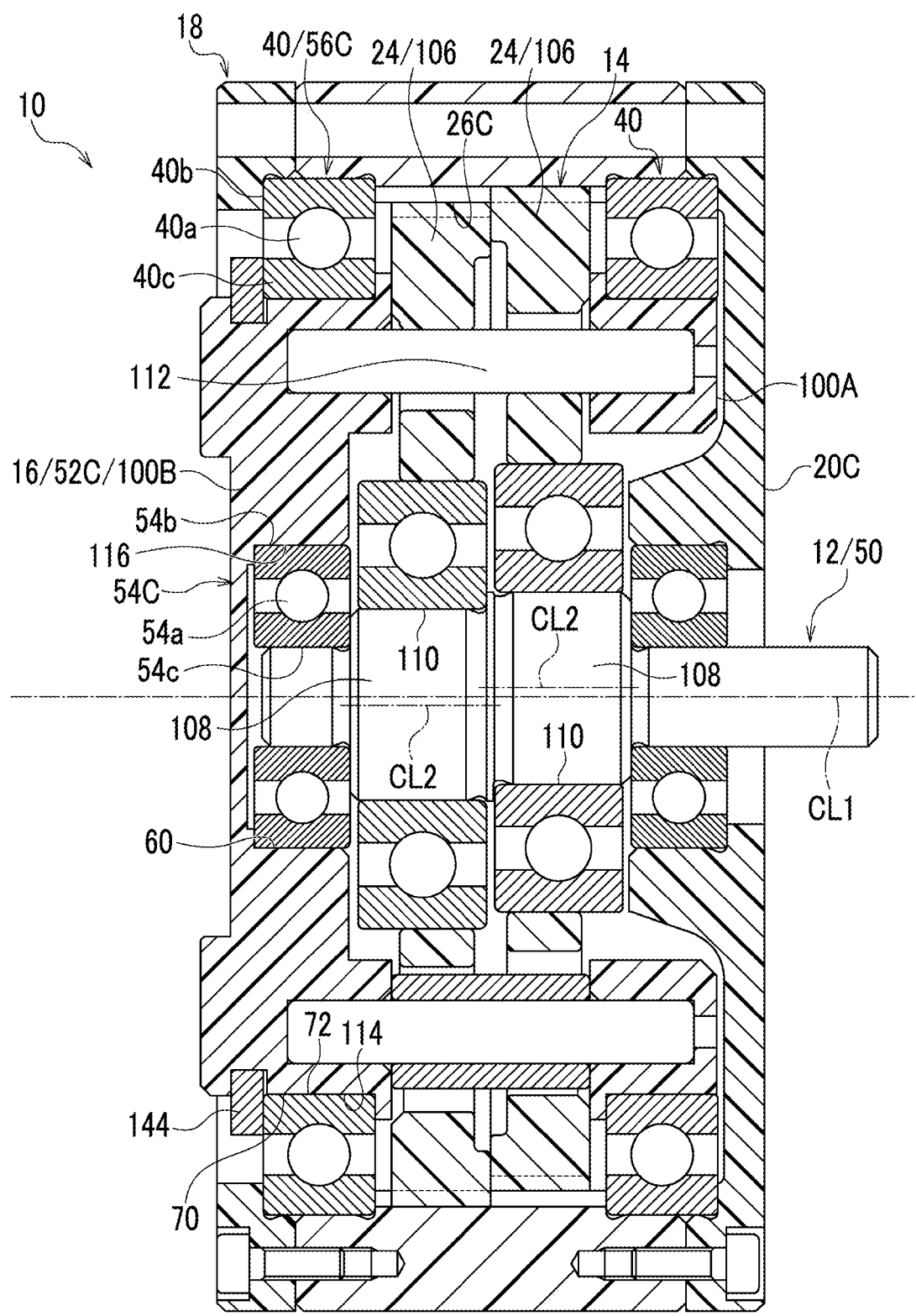
FIG. 5 is a side cross-sectional view of a power transmission device of another embodiment.

Other than this, the assembly process is the same as an assembly process used in a normal method for manufacturing the power transmission device 10. Namely, the power transmission device 10 is assembled using an intermediate product obtained by fitting the support members 52A and 52B and the fitting members 56A and 56B to each other, and the other components of the power transmission device 10. Since this process itself is known, a detailed description thereof will not be repeated. Another embodiment Referring to FIG. 5, the power transmission device 10 of the present embodiment includes a first carrier 100A disposed on one side in the axial direction (right side in the drawing) with respect to the gear mechanism 14; a second carrier 100B disposed on the other side in the axial direction (left side in the drawing) with respect to the gear mechanism 14; and a cover 20C disposed on one side in the axial direction with respect to the first carrier 100A, in addition to the input shaft 12, the gear mechanism 14, the output member 16, and the casing 18 described above. The output member 16 of the present embodiment is the second carrier 100B.

The gear mechanism 14 of the present embodiment is different from that of one embodiment in that the gear mechanism 14 is an eccentric oscillation type gear mechanism. The gear mechanism 14 includes the external gear 24 and an internal gear 26C which mesh with each other and of which one serves as an oscillating gear 106. The gear mechanism 14 can oscillate the oscillating gear 106 to rotate one of the external gear 24 and the internal gear 26C, and to extract an axial rotation component thereof from the output member 16 as output rotation. In the present embodiment, the external gear 24 serves as the oscillating gear 106, and the external gear 24 can be rotated.

The input shaft 12 of the present embodiment is a crankshaft including a plurality of eccentric bodies 108. The eccentric bodies 108 have axial centers CL2 that are eccentric with respect to a rotation center line CL1 of the input shaft 12, and can rotate around the rotation center line CL1 to oscillate the oscillating gear 106 (external gear 24). The plurality of eccentric bodies 108 have eccentric phases different from each other. When the number of the eccentric bodies 108 is M (two in the present embodiment), the eccentric phases of the plurality of eccentric bodies 108 are offset from each other by (360°/M). The number of eccentric bodies 108 is not particularly limited and may be singular or three or more.

The oscillating gear 106 is individually provided to correspond to each of the plurality of eccentric bodies 108, and is rotatably supported by the corresponding eccentric body 108 through an eccentric body bearing 110.

The internal gear 26C of the present embodiment is integrated with the casing 18. The main bearing 40 is disposed between the casing 18 and the carriers 100A and 100B.

The carriers 100A and 100B are integrated with a plurality of pins 112 protruding from the carriers 100A and 100B in the axial direction. The plurality of pins 112 penetrate through the external gear 24 in an axial direction X, and can synchronize the axial rotation component of the external gear 24 with the carriers 100A and 100B. The "synchronization with the axial rotation component" mentioned here refers to maintaining the axial rotation component of the external gear 24 and axial rotation components of the carriers 100A and 100B at the same magnitude within a numerical range including zero.

An operation of the power transmission device 10 described above will be described. In the present embodiment, the oscillating gear 106 is oscillated by the eccentric bodies 108 of the crankshaft forming the input shaft 12. When the oscillating gear 106 oscillates, a meshing position of the external gear 24 and the internal gear 26C changes in the circumferential direction. As a result, one (in the present embodiment, the external gear 24) of the external gear 24 and the internal gear 26C rotates, and an axial rotation component thereof is extracted from the output member 16 as output rotation.

The power transmission device 10 of the present embodiment also includes a support member 52C, a rotary shaft bearing 54C, and a fitting member 56C in addition to the rotary shaft 50 described above. A main function of the support member 52C, the rotary shaft bearing 54C, and the fitting member 56C is common to that of a combination of the support member 52A, the rotary shaft bearing 54A, and the fitting member 56A described in one embodiment. Hereinafter, differences will be mainly described.

The rotary shaft 50 of the present embodiment is a crankshaft (input shaft 12). The driven gear 58 that is moved by the rotation of the rotary shaft 50 of the present embodiment is the oscillating gear 106.

The support member 52C of the present embodiment is the second carrier 100B (output member 16). The second carrier 100B of the present embodiment is made of a resin-based material, for example, a resin such as polyamide (PA) or polyphthalamide (PPA). The support member 52C includes a bearing disposition portion 114 which is provided at an outer peripheral portion of the support member 52C and on which the main bearing 40 is disposed. The support member 52C of the present embodiment does not include the through-hole 78 described in one embodiment, but includes a central recessed portion 116 that is recessed in the axial direction, at a central portion of the support member in the radial direction. The bearing disposition portion 60 of the support members 52A and 52B is provided at an inner peripheral portion of the central recessed portion 116.

The rotary shaft bearing 54C is disposed between the support member 52C and the rotary shaft 50.

The fitting member 56C of the present embodiment is formed of the main bearing 40 disposed between the casing 18 and the second carrier 100B. The main bearing 40 includes a plurality of rolling elements 40a, and an outer ring 40b and an inner ring 40c on each of which the plurality of rolling elements 40a roll. The outer ring 40b of the present embodiment is provided separately from the casing 18, as a dedicated component for the main bearing 40. The inner ring 40c of the present embodiment is provided separately from the support member 52C, as a dedicated component for the main bearing 40.

The outer peripheral fitting portion 70 of the support member 52C is formed of the bearing disposition portion 114 of the support member 52C. The inner peripheral fitting portion 72 of the fitting member 56C is provided at an inner peripheral portion of the inner ring 40c of the main bearing 40. In the present embodiment as well, the inner peripheral fitting portion 72 of the fitting member 56C and the outer peripheral fitting portion 70 of the support member 52C are fitted to each other.

The main bearing 40 forming the fitting member 56C is made of a metal-based material. In the present embodiment, the rolling elements 40a, the outer ring 40b, and the inner ring 40c of the main bearing 40 are all made of a metal-based material, specifically, steel. As described above, the fitting member may have lower hygroscopicity than that of the support member, the specific example of the material is not limited to a resin-based material, and the fitting member may be made of a metal-based material as in the present embodiment.

The power transmission device 10 of the present embodiment also includes the fitting member 56C fitted to the outer peripheral portion of the support member 52C, and the fitting member 56C is made of a material having lower hygroscopicity than that of the support member 52C. Therefore, similarly to the description in (A) of one embodiment, the support rigidity of the rotary shaft bearing 54C can be increased.

Further, the power transmission device 10 of the present embodiment also includes the components described in (D) described above, and an effect corresponding to the description can be obtained.

In addition, according to the present embodiment, the bulging deformation of the support member 52C is constrained using the main bearing 40 made of a metal-based material and forming the fitting member 56C, so that similarly to the above description, the support rigidity of the rotary shaft bearing 54C can be increased. From the viewpoint of obtaining such an effect, the bearing forming the fitting member 56C is not limited to the main bearing 40, and may be another bearing.

The power transmission device 10 of the present embodiment is also a combination of resin members and metal members. The resin members of the present embodiment are the oscillating gear 106 (external gear 24), the first carrier 100A, the second carrier 100B, and the casing 18. The metal members of the present embodiment are the crankshaft (rotary shaft 50), the rotary shaft bearing 54C, the internal gear 26C, and the like.

Further Embodiment

Figure 6:
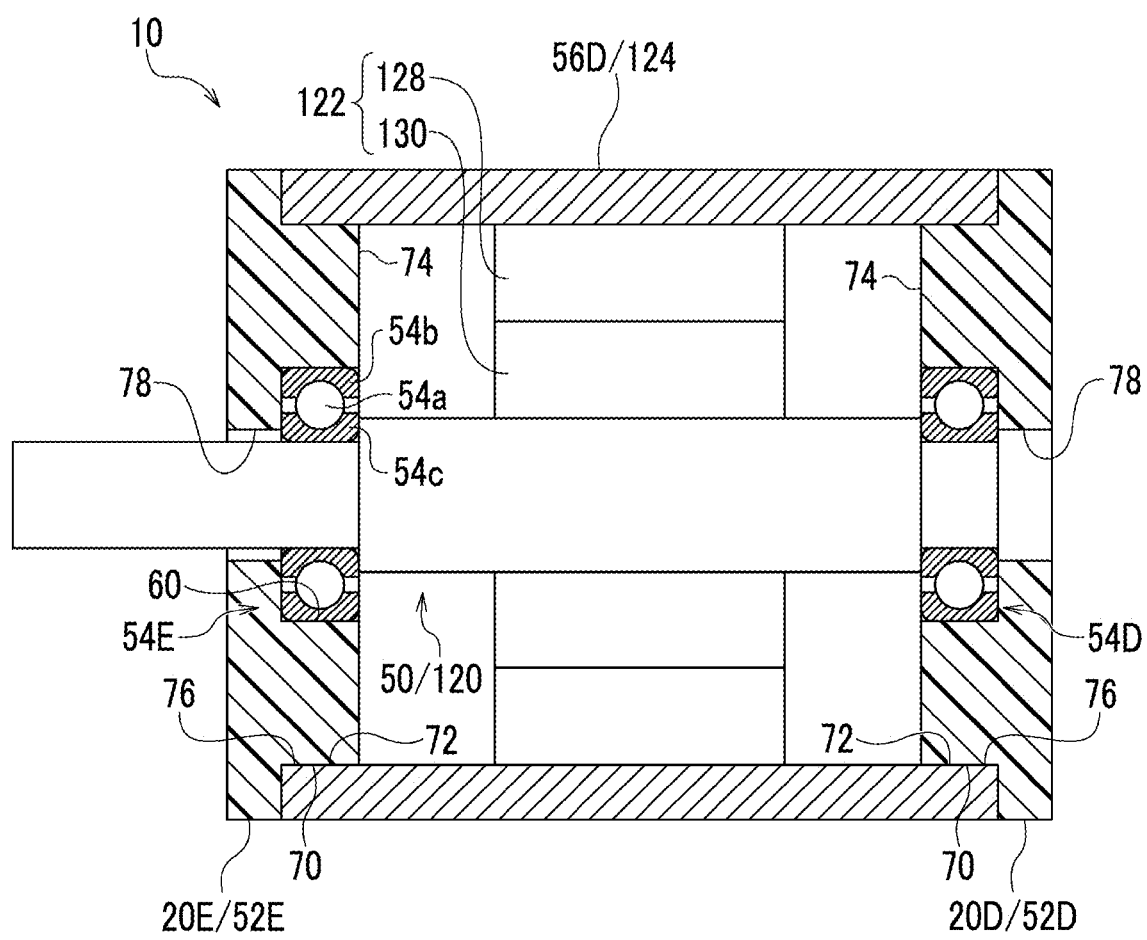
FIG. 6 is a side cross-sectional view of a power transmission device of further embodiment.

Referring to FIG. 6, the power transmission device 10 of the present embodiment is a motor device. The power transmission device 10 includes a rotor shaft 120; a motor 122 that generates a rotating magnetic field to rotate the rotor shaft 120; a motor housing 124 to which a stator 128 of the motor 122 is fixed; and covers 20D and 20E that cover the motor 122 in the axial direction. The covers 20D and 20E include the first cover 20D disposed on one side in the axial direction (counter load side and the right side in the drawing) with respect to the motor 122, and the second cover 20E disposed on the other side in the axial direction (load side and the left side in the drawing) with respect to the motor 122, respectively.

The rotor shaft 120 can output rotational power to a driven device. The motor 122 includes the stator 128 and a rotor 130 that rotates integrally with the rotor shaft 120.

The power transmission device 10 of the present embodiment also includes the rotary shaft 50 described above, support members 52D and 52E, rotary shaft bearings 54D and 54E, and a fitting member 56D. A main function of the support member 52D, the rotary shaft bearing 54D, and the fitting member 56D is common to that of a combination of the support member 52A, the rotary shaft bearing 54A, and the fitting member 56A described in one embodiment. Further, a main function of the support member 52E, the rotary shaft bearing 54E, and the fitting member 56D is common to that of a combination of the support member 52B, the rotary shaft bearing 54B, and the fitting member 56B described in one embodiment. Hereinafter, differences will be mainly described.

The rotary shaft 50 of the present embodiment is the rotor shaft 120.

The support members 52D and 52E of the present embodiment are the covers 20D and 20E. The covers 20D and 20E of the present embodiment are made of a resin-based material, for example, a resin such as polyamide (PA) or polyphthalamide (PPA). The support members 52D and 52E include the first support member 52D that is the first cover 20D, and the second support member 52E that is the second cover 20E, respectively. Both the first support member 52D and the second support member 52E include respective through-holes 78 similarly to the support members 52A and 52B of one embodiment.

The rotary shaft bearings 54D and 54E include the first rotary shaft bearing 54D disposed between the support member 52D and the rotary shaft 50, and the second rotary shaft bearing 54E disposed between the support member 52E and the rotary shaft 50, respectively.

The fitting member 56D of the present embodiment is the motor housing 124. The motor housing 124 of the present embodiment is made of a metal-based material, for example, an aluminum alloy.

The outer peripheral fitting portions 70 of the support members 52D and 52E of the present embodiment are provided at outer peripheral portions of the annular protrusions 74, and the inner peripheral fitting portion 72 of the fitting member 56D is provided at an inner peripheral portion of the recessed portion 76.

The power transmission device 10 of the present embodiment also includes the fitting member 56D fitted to outer peripheral portions of the support members 52D and 52E, and the fitting member 56D is made of a material having lower hygroscopicity than that of the support members 52D and 52E. Therefore, similarly to the description in (A) of one embodiment, the support rigidity of the rotary shaft bearings 54D and 54E can be increased.

Further, the power transmission device 10 of the present embodiment also includes the components described in (C) and (D) described above, and effects corresponding to the description can be obtained.

Further, according to the present embodiment, the bulging deformation of the covers 20D and 20E is constrained using the motor housing 124 in the motor device, so that similarly to the above description, the support rigidity of the rotary shaft bearings 54D and 54E can be increased.

The power transmission device 10 of the present embodiment is also a combination of resin members and metal members. The resin members of the present embodiment are the first cover 20D and the second cover 20E. The metal members of the present embodiment are the rotor shaft 120 (rotary shaft 50), the rotary shaft bearings 54D and 54E, the motor 122, the motor housing 124, and the like.

Other modification forms of each component will be described. Hereinafter, when the components (support member and the like) having "A, B, C, . . . " at ends of the reference symbols are collectively referred to, the letters attached to the ends of the reference symbols will be omitted.

The specific example of the gear mechanism 14 is not particularly limited. The gear mechanism 14 may be, for example, any one of a planetary gear mechanism, an orthogonal-axis gear mechanism, a parallel-axis gear mechanism, and the like.

As a specific type of the eccentric oscillation type gear mechanism, a center crank type in which the crankshaft (input shaft 12) is disposed on an axial center of the internal gear 26 has been described. The type is not particularly limited and may be, for example, a distributing type in which a plurality of the crankshafts are disposed at respective positions offset from the axial center of the internal gear 26 in the radial direction. Further, when the external gear 24 serves as the oscillating gear 106 in the eccentric oscillation type gear mechanism, the casing 18 may serve as the output member 16. Further, instead of the external gear 24, the internal gear 26 may serve as the oscillating gear 106.

The tubular type has been described as a specific type of the bending meshing type gear mechanism. The type is not particularly limited and may be, for example, a cup type or a top hat type. Further, when the external gear 24 serves as the bending gear 22 in the bending meshing type gear mechanism, the casing 18 may serve as the output member 16. Further, instead of the external gear 24, the internal gears 26 may serve as the bending gear 22.

As the rotary shaft 50, the input shaft in the power transmission device 10 of one and another embodiments and the rotor shaft 120 in further embodiment have been described as examples. The specific example is not particularly limited. The rotary shaft 50 may be, for example, the output shaft that outputs rotation to the driven device, or an intermediate shaft that transmits the rotation of the input shaft to the output shaft.

The fitting member 56 may be fitted to the outer peripheral portion of the support member 52, and the specific example is not particularly limited. The "outer peripheral portion of the support member 52" mentioned here is not necessarily an outermost peripheral portion forming an outermost peripheral surface of the support member 52. For example, as shown in FIG. 1, in addition to an outermost peripheral portion 140 forming an outermost peripheral surface of the second support member 52B, the second support member 52B of one embodiment includes an annular groove portion 142 provided inside the outermost peripheral portion 140 in the radial direction. An outer peripheral portion of the annular groove portion 142 forms the outer peripheral portion of the annular protrusion 74 of the second support member 52B. It is meant that the "outer peripheral portion of the support member 52B" mentioned here may be the outer peripheral portion of the annular groove portion 142 forming the outer peripheral portion of the support member 52B.

The specific example of a combination of the support member 52 and the fitting member 56 is not particularly limited. In the example of one embodiment, when the support member 52 serves as the cover 20, the fitting member 56 may be formed of a part of the casing 18 provided separately from the internal gear 26, or may be provided separately from the casing 18 and from the internal gear 26. In the example of another embodiment, when the support member 52 serves as the carrier 100, the fitting member 56 may be a retaining ring 144 (refer to FIG. 5) that restricts the movement of the main bearing 40 in the axial direction.

In one embodiment, an example in which a gear forming the fitting member 56A made of a resin-based material is the internal gear 26 has been described, but the specific example is not particularly limited. The gear may be, for example, an external gear, a bevel gear, or the like.

When the fitting member 56 serves as a bearing, the specific example of the material is not limited to a metal-based material. The material may be, for example, a resin-based material.

The support member 52 may expand due to moisture absorption under an environment where the absolute humidity is less than 0.003, so that the tightening load F acts on the rotary shaft bearing 54 from the support member 52.

The support member 52 of one and further embodiments may not include the through-hole 78, and the support member 52 of another embodiment may include the through-hole 78.

The fit location between the support member 52 and the fitting member 56 and the rotary shaft bearing 54 may not overlap each other when viewed in the radial direction.

The power transmission device 10 to which the manufacturing method described in one embodiment is applied is not particularly limited. The manufacturing method may be used for the power transmission device 10 of another and further embodiments, and may be used for other power transmission devices 10.

The embodiments and the modification forms described above are provided as examples. The technical concept that is abstracted from the embodiments and from the modification forms should not be interpreted as being limited to the contents of the embodiments and of the modification forms. Many design changes such as changing, adding, and removing the components can be made to the contents of the embodiment and of the modification forms. In the above-described embodiments, contents to which such design changes can be made are emphasized with a notation of "embodiment". However, design changes to contents without such a notation are also allowed. The hatching applied to the cross sections of the drawings does not limit the material of a hatched object. The structures and the numerical values mentioned in the embodiments and in the modification forms naturally include those that can be regarded as being the same when manufacturing errors and the like are taken into account.

It should be understood that the invention is not limited to the above-described embodiment, but may be modified into various forms on the basis of the spirit of the invention. Additionally, the modifications are included in the scope of the invention.

What is claimed is:

1. A power transmission device comprising:
a rotary shaft;
a support member disposed outside the rotary shaft in a radial direction;
a bearing disposed between the rotary shaft and the support member; and
a fitting member fitted to an outer peripheral portion of the support member,
wherein the fitting member is made of a material having lower hygroscopicity than hygroscopicity of a material of the support member,
the support member is made of a resin-based material, and
the fitting member is a gear made of a resin-based material having lower hygroscopicity than hygroscopicity of the resin-based material forming the support member.

2. The power transmission device according to claim 1, wherein the fitting member is a bearing made of a metal-based material.

3. The power transmission device according to claim 1, wherein the support member is a cover that covers a motor in an axial direction, and
the fitting member is a motor housing to which a stator of the motor is fixed.

4. The power transmission device according to claim 1, wherein the support member includes a through-hole at a central portion in the radial direction of the rotary shaft, the through-hole penetrating through the support member in an axial direction.

5. The power transmission device according to claim 1, wherein a fit location between the support member and the fitting member and the bearing overlap each other when viewed in the radial direction of the rotary shaft.

6. The power transmission device according to claim 1, wherein the bearing includes a rolling element, an outer ring and an inner ring on each of which the rolling element rolls, and a seal member that seals an internal space of the bearing.

7. The power transmission device according to claim 1, further comprising:
a gear mechanism that transmits a rotation of the rotary shaft.

8. The power transmission device according to claim 7, wherein the gear mechanism is a bending meshing type gear mechanism.

9. The power transmission device according to claim 7, wherein the gear mechanism is an eccentric oscillation type gear mechanism.

10. The power transmission device according to claim 9, further comprising:
a first carrier disposed on one side in an axial direction with respect to the gear mechanism; and
a second carrier disposed on the other side in the axial direction with respect to the gear mechanism.

11. The power transmission device according to claim 10, wherein the first carrier and the second carrier include a plurality of pins protruding from the first carrier and from the second carrier in the axial direction.

12. A power transmission device comprising:
a rotary shaft;
a support member disposed outside the rotary shaft in a radial direction;
a bearing disposed between the rotary shaft and the support member; and
a fitting member fitted to an outer peripheral portion of the support member,
wherein the fitting member is made of a material having lower hygroscopicity than hygroscopicity of a material of the support member, and
under an environment where an absolute humidity is 0.003 (kg/kg) or higher, the support member expands due to moisture absorption in a state where the support member and the fitting member are fitted to each other, so that a tightening load acts on the bearing from the support member.

13. A method for manufacturing a power transmission device including a rotary shaft, a support member disposed outside the rotary shaft in a radial direction, a bearing disposed between the rotary shaft and the support member, and a fitting member fitted to an outer peripheral portion of the support member, in which the fitting member is made of a material having lower hygroscopicity than hygroscopicity of a material of the support member, the method comprising:
a drying process of drying at least the support member; and
a fitting process of fitting the support member dried in the drying process and the fitting member to each other.

* * * * *